Dec. 4, 1962    H. KITTEL ET AL    3,066,866
ADDING APPARATUS
Filed Sept. 17, 1958    7 Sheets-Sheet 1
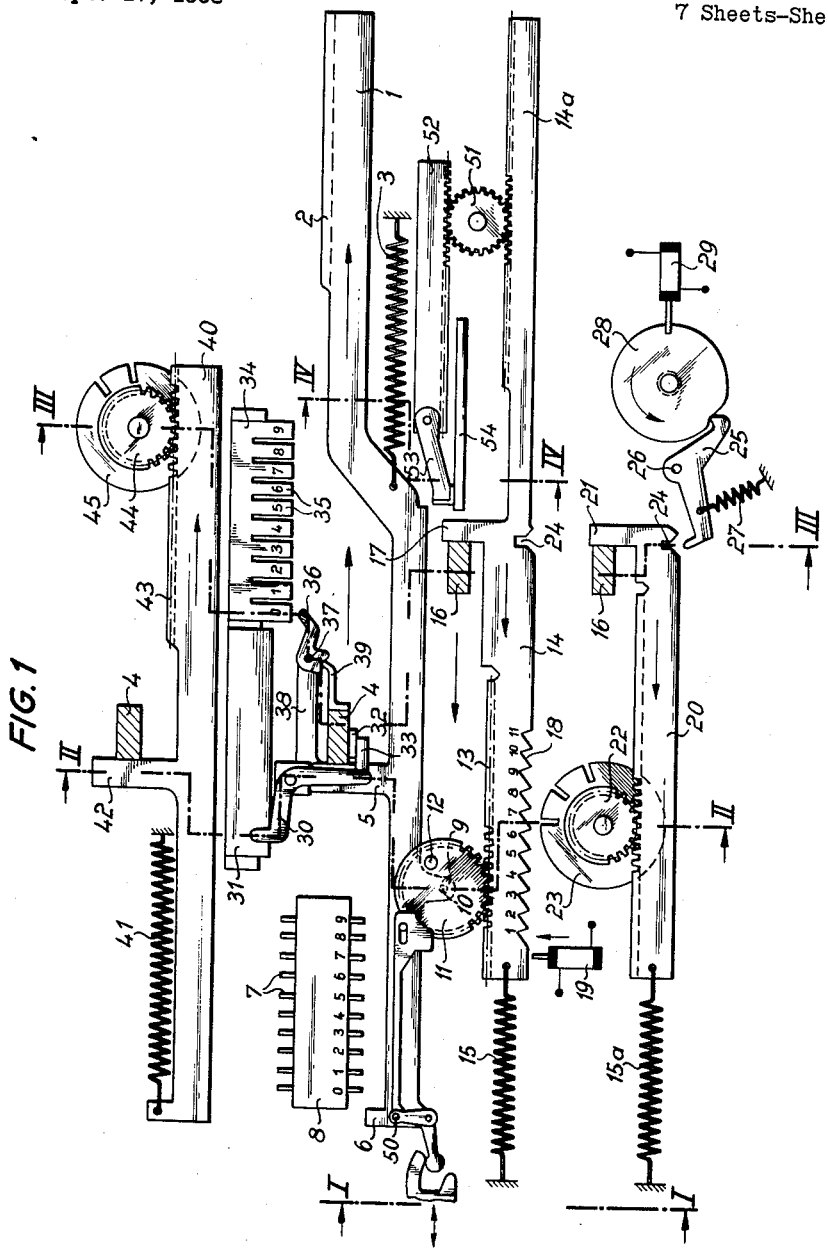
INVENTORS
Hermann Kittel
Willy Schellip
by:
Michael S. Striker
Attorney

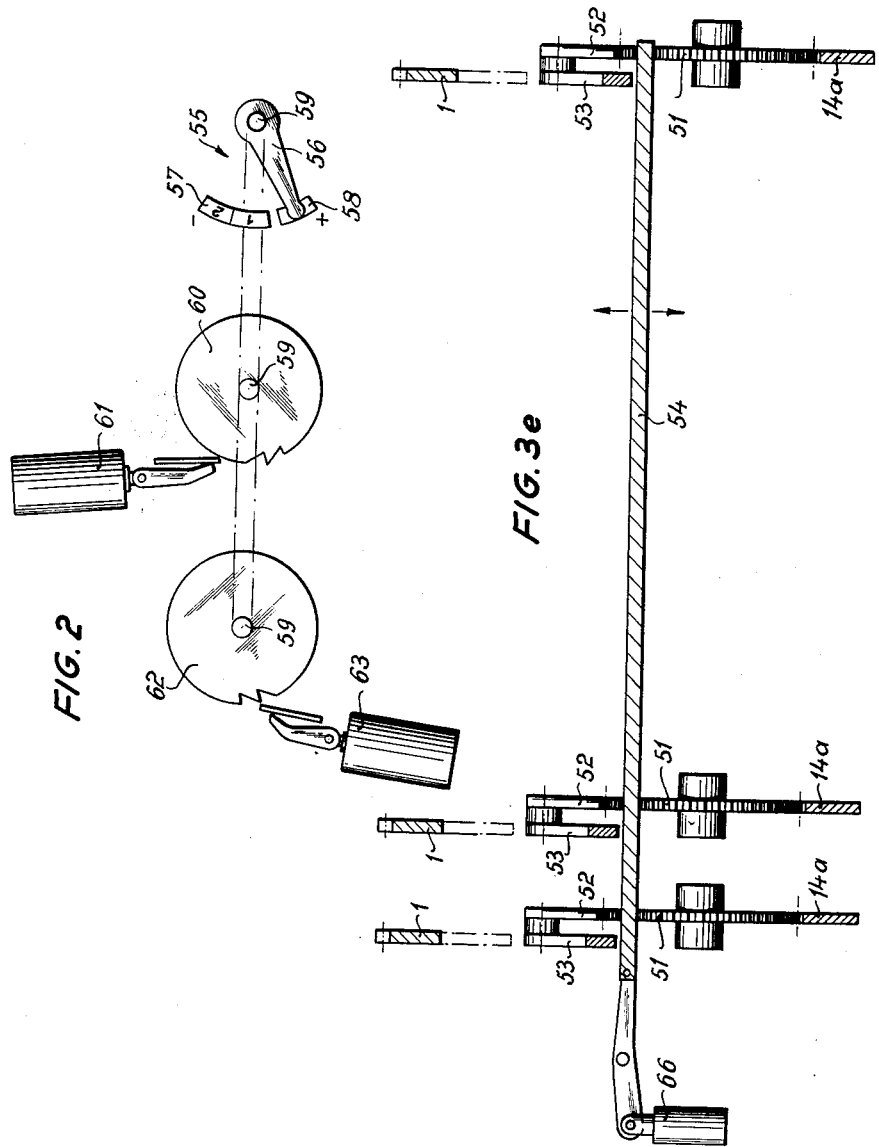

Dec. 4, 1962
H. KITTEL ET AL
3,066,866
ADDING APPARATUS
Filed Sept. 17, 1958
7 Sheets-Sheet 3
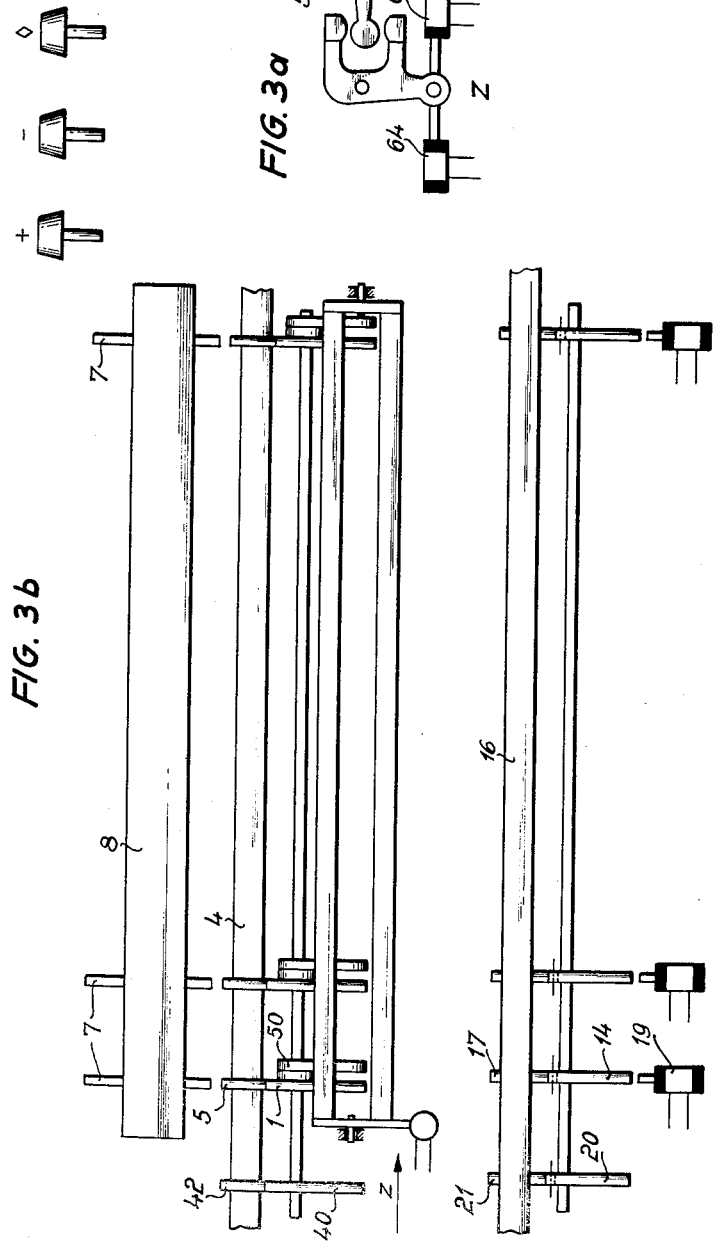
INVENTORS
Hermann Kittel
Willy Schedlig
by: Michael S. Striker
Attorney

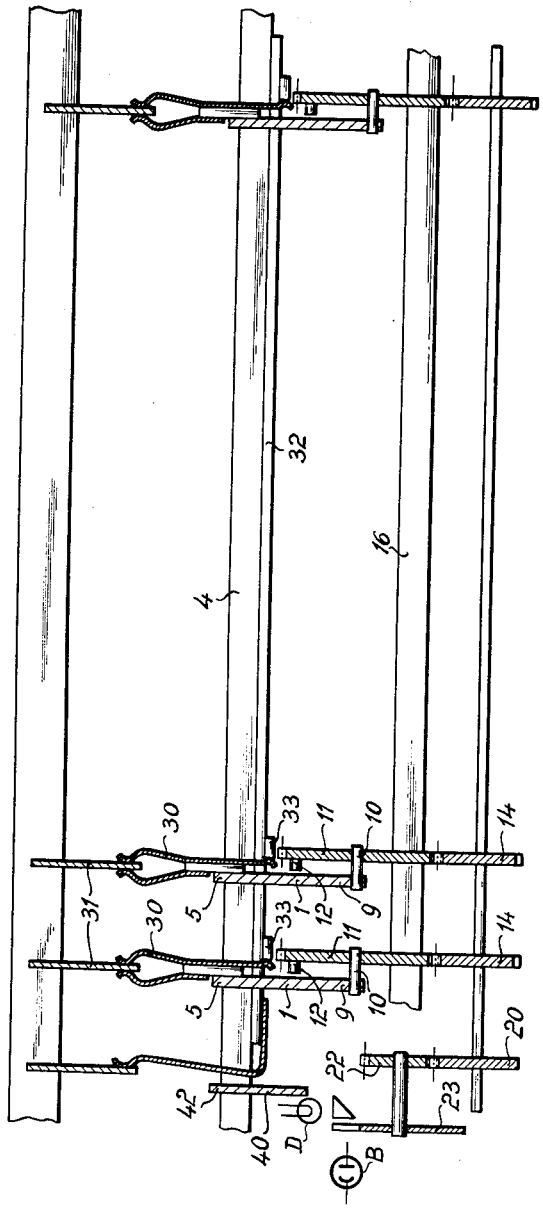

Dec. 4, 1962 H. KITTEL ET AL 3,066,866
ADDING APPARATUS
Filed Sept. 17, 1958 7 Sheets-Sheet 5

INVENTORS
Hermann Kittel
Willy Schellig
by:
Michael S. Striker
Attorney

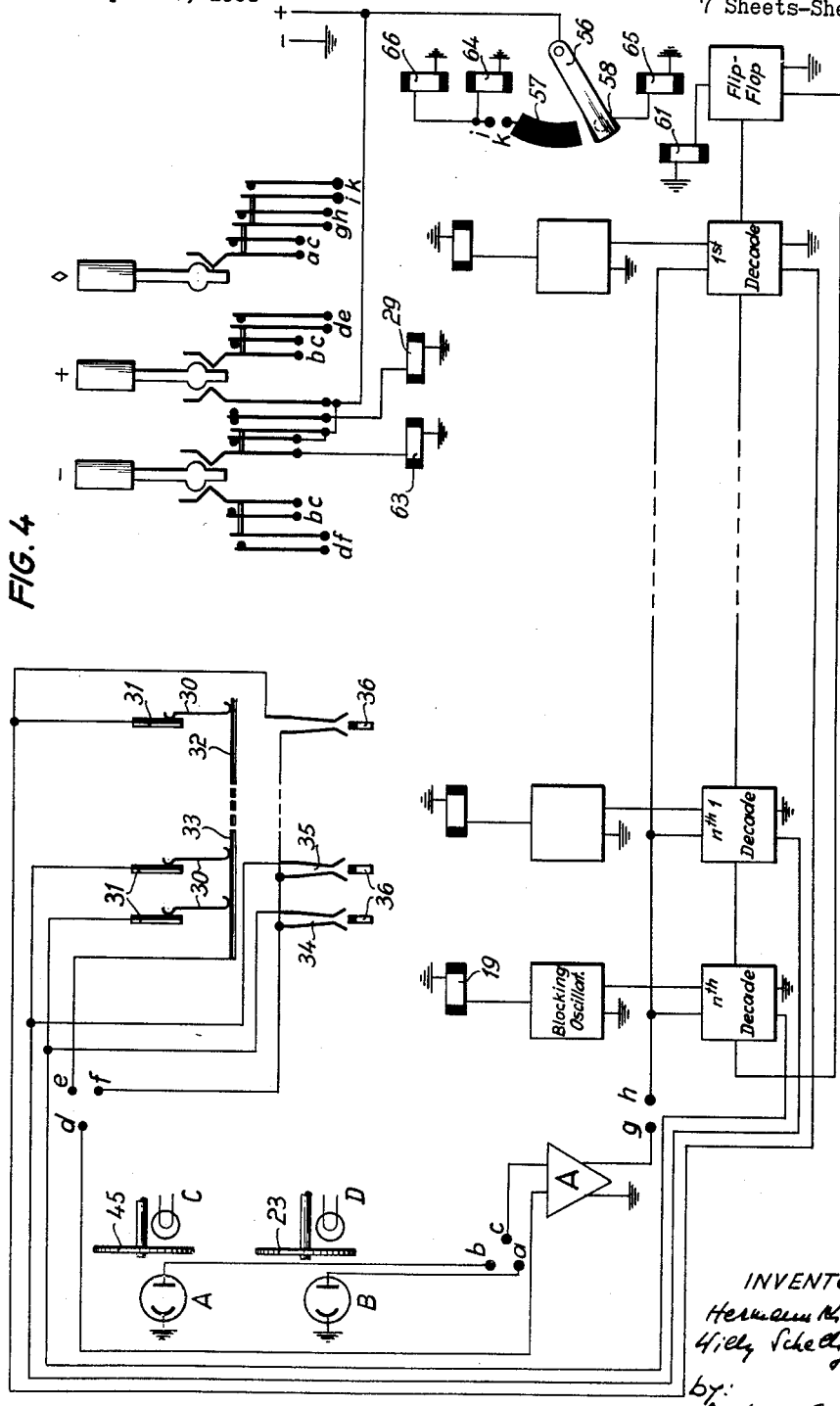

Dec. 4, 1962 H. KITTEL ET AL 3,066,866
ADDING APPARATUS
Filed Sept. 17, 1958 7 Sheets-Sheet 7

INVENTORS
Hermann Kittel
Willy Schellig
by:
Michael S. Striker
Attorney

United States Patent Office 3,066,866
Patented Dec. 4, 1962

3,066,866
ADDING APPARATUS
Hermann Kittel and Willy Schellig, Villingen, Black Forest, Germany, assignors to Firma Kienzle Apparate G.m.b.H., Villingen, Black Forest, Germany
Filed Sept. 17, 1958, Ser. No. 761,581
Claims priority, application Germany Sept. 18, 1957
26 Claims. (Cl. 235—173)

The present invention relates to an adding apparatus, and more particularly to an adding apparatus which combines mechanical digital means with an electronic counter.

In ten-key adding machines according to the known art, a denominational series of digital elements controls a mechanical totalizer and printing means.

It is the object of the present invention to provide a new adding apparatus which is of simpler construction than the apparatus of the prior art, and operates more rapidly and reliably.

It is also an object of the present invention to combine in a calculating machine mechanical input and output means with an electronic counter.

Another object of the present invention is to provide an adding apparatus which facilitates subtractions, and permits computing of totals below zero.

The apparatus of the present invention includes a ten-key keyboard, a pin-carriage, a denominational series of digital bars or sectors, and printing means of the type used in the prior art. However, the mechanical means control an electronic counter during input operations, and are controlled by the electronic counter during reading out of totals.

The adding apparatus of the present invention mainly comprises a denominational series of digital means movable between digital positions; electronic counter means; read-out means interconnecting the electronic counter means with the digital means for determining the position of the digital means under control of the counter means; and read-in means for actuating the counter means in acordance with the digital positions of the digital means. The phrase "a denominational series of means" is used in the present application to express the idea that each means of a series represents, or is associated with a denomination, such as a decimal order.

The term "digital means" is used in the present application to express the idea that the respective means is capable of representing different digits by different "digital" positions or conditions which respectively represent, or are associated with different digits.

Impulse producing means are provided which are controlled by the mechanical digital means to produce a series of electrical impulses whose number depends on the digital position of the respective digital means. Such impulses are counted by the counter during an input operation. The switch means which connect the mechanical digital means with the electronic counter are so constructed that they can be selectively operated for transmitting to the counter a number of impulses corresponding to a digit, or a number of impulses corresponding to the complement of a digit. Thereby, additions of complement numbers are carried out by the electronic counter during subtractions. Means are provided to control the printing device in accordance with the real digits, even if additions of complement numbers are carried out.

Reading out of numbers registered in the electronic counter is accomplished by operating the counter until it passes through zero position, and to stop mechanical digital elements when the counter passes through zero position so that the digital elements are stopped in positions representing a complement value. Other digital elements are operated in accordance with the present invention to almost simultaneously move to positions representing real numerical values, and can consequently be used for operating a printing device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGURE 1 is an exploded side view of a mechanism according to the present invention;

FIGURE 2 is an exploded fragmentary view illustrating a control apparatus;

FIGURE 3a shows some detail of FIGURE 1; whereas FIGURE 3b–3e are sections on lines I—I, II—II, III—III and IV—IV of FIGURE 1;

FIGURE 4 is a diagram illustrating the electric circuits according to the present invention.

Figure 3D:
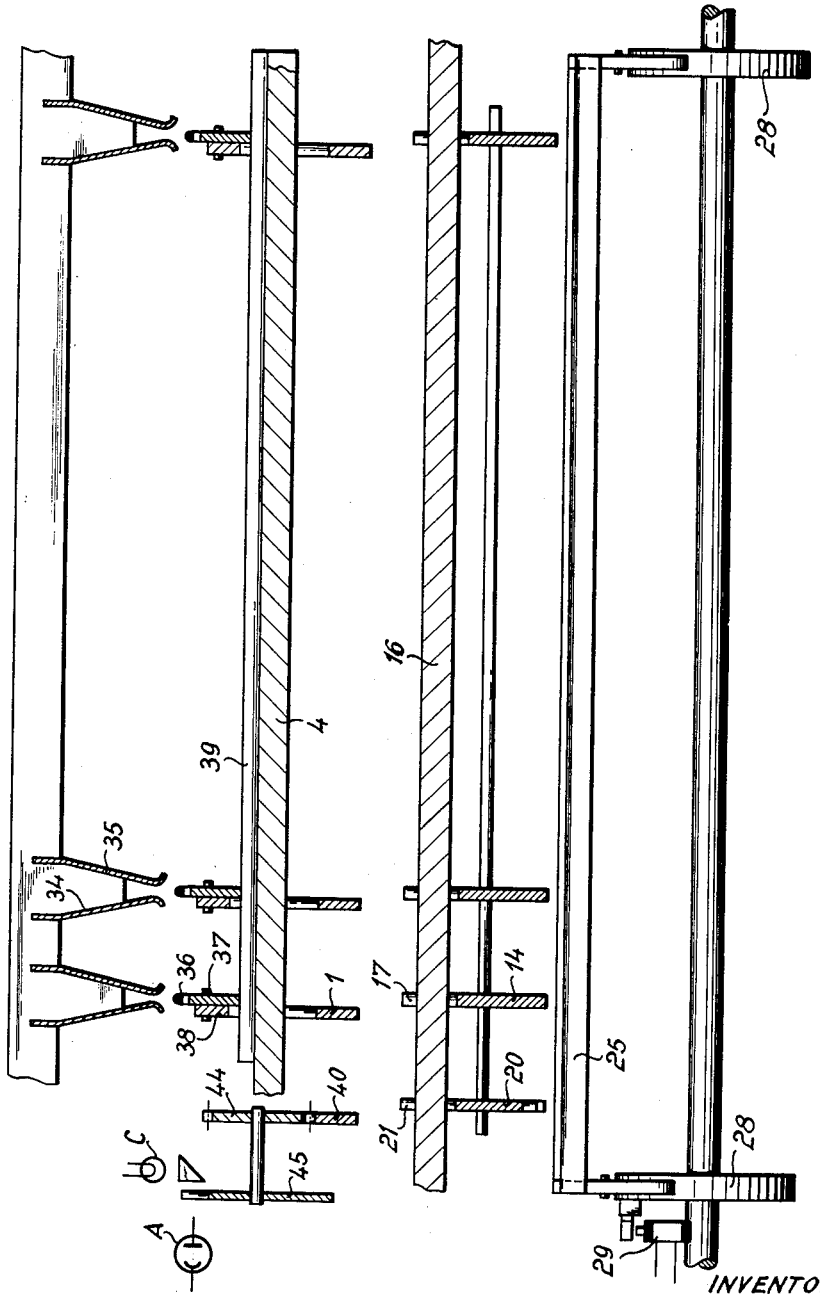

Referring now to the drawings, and more particularly to FIGURE 1, a denominational series of digital elements 1 is provided of which only a single element is shown. Each digital element 1 is provided with a rack portion 2 by which an associated printing means is controlled. Springs 3 urge elements 1 to move in direction of the arrow to the right as viewed in FIGURE 1 so that the projections 5 of elements 1 abut against a transverse control bar 4. At the end of each element 1, the projection 6 is provided which cooperates with a row of pins associated wtih the same denominational order and provided on the pin carriage 8. The pins 7 of the pin carriage 8 are set in a conventional manner by operation of a ten-key keyboard. It is evident that when control bar 4 is moved to the right in direction of the arrow, the digital elements 1 will move in the same direction until stopped by actuated pins 7 in digital positions representing the same digit as the actuated pin 7.

Each element 1 has a projection 9 on which a toothed wheel is turnably mounted by means of a pin 10. A stop 12 is fixed to each toothed wheel 11 and will stop the turning movement of wheel 11 when engaging the other side of projection 9.

Another set of digital elements 14 is provided below the set of digital elements 1, and each element 14 has a toothed rack portion 13 meshing with the associated gear 11. Springs 15 urge elements 14 to the left as viewed in FIGURE 1 until they abut with projections 17 against a second control bar 16. When control bar 16 is moved in direction of the arrow, all elements 14 will move in the same direction. It will be understood that such movement will result in turning of the associated gears 11 until stop 12 has turned into a position engaging the other side of projection 9. When control bar 4 is moved to the right at the same time as control bar 16 is moved to the left, the turning of gear 11 will be influenced by both elements 1 and 14, and stop 12 will sooner engage the projection 9 and be stopped. Since springs 15 are stronger than springs 3, each element 14 will reverse the direction of movement of the associated bar 1 when gear 11 is blocked by pin 12, and bars 1 will move to the left together with bars 14.

Each element 14 is provided with a set of eleven recesses 18, and an electro-magnetic stop means 19 is provided, which, when actuated, engages one of the recesses 18 to stop movement of the elements 14 in different positions even if elements 14 are released by control bar 16.

FIG. 1 is an exploded view, and in the same horizontal plane as elements 14, a control element 20 is provided, so that control bar 16 is shown twice in cross section. FIGS. 3b–3e show the parts in their correct position with respect to each other in cross section. Similarly, a control bar 40 is provided in the same horizontal plane as elements 1 so that control bar 4 is twice shown in cross section.

A spring 15a urges control element 20 to the left in direction of the arrow so that the projection 21 abuts against control bar 16. Control element 20 has a rack portion which meshes with a gear 22 connected to a slotted disk 23 for rotation. Consequently, when control bar 16 is moved to the left, not only elements 14, but also control element 20 will move to the left, resulting in turning of the slotted disk 23.

Disk 23 is located between a source of light D and a photocell B (see FIGS. 3c and 4) which is electrically connected to each denominational order of an electronic counter. Since ten slots are provided in disk 23, ten impulses are transmitted to each denominational order of the electronic counter. This device is used for reading out a number registered in the electronic counter, as will be described hereinafter in detail.

All elements 14, and control element 20 have aligned recesses 24 which cooperate with a transverse catch bar of a catch means 25. Catch means 25 is turnably mounted on shaft means 26, and is urged by a spring means 27 to turn in counterclockwise direction so that its free end slides on the endless cam track of a cam 28. An electro-magnetic stop means 29 normally holds cam 28 in the illustrated position in which catch means 25 is retracted and inoperative. When electromagnetic means 29 is actuated, it will release cam 28 for such a time as to permit a single revolution of cam 28, whereupon cam 28 is again stopped. During such revolution of cam 28, catch means 25 will engage all recesses 24 and will block movement of elements 14 and element 20.

Each digital element 1 has a fixed slide contact 30 mounted thereon. An elongated contact 31 is provided for each contact 30, and during movement of elements 1, the respective slide contacts 30 will slide on the associated contact bar 31. Another contact bar 32 extends in transverse direction and is secured to control bar 4 so as to move with the same. Another contact 33 is connected to each contact 30 and is mounted on projection 5 of each element 1. As long as projections 5 engage control bar 4, contacts 33 engage contact bar 32.

On the same supporting means on which the denominational series of contact bars 31 are mounted, another denominational series of sets of digital contacts 35 is supported. Ten digital contact pairs 34, 35 are associated with each digital element 1, and more particularly with a pivotable contact 36 which is turnable about a pin 37 secured to a bracket 38 on the respective projection 5.

It will be noted that in the illustrated position, only slide contacts 30 are in conductive engagement with associated contact bars 31, whereas contacts 36 are in an inoperative position retracted from contacts 34, 35. This is due to the fact that control bar 4 abuts against projections 5. When a digital element 1 is blocked by pin carriage 8, and control bar 4 is moved to the right in direction of the arrow, an actuating member 39 on control bar 4 will act on a cam portion of contact 36 and move contact 36 into an operative position engaging a pair of digital contacts 34, 35 to establish electrical connections.

A second control element 40 is provided in the same horizontal plane as digital elements 1 and is controlled by control bar 4. Control element 40 is urged to the right as viewed in FIGURE 1 by a spring 41 so that projection 42 abuts against control bar 4. Control element 40 has a rack portion 43 meshing with a gear 44 which is fixed to another slotted disk 45. Disk 45 has nine slots and is located between a source of light C and a photocell A (see FIGS. 3d and 4) so that upon movement of control element 40, electrical impulses are produced which are supplied to each denominational order of the electronic counter. This device is used for introducing numbers into the electronic counter.

Digital elements 14 are provided with extended rack portions 14a meshing with toothed wheels 51, which are mounted on a fixed axle 51a. Toothed wheels 51 mesh with digital rack bars 52, each of which is provided with a pawl 53 designed to cooperate with a recessed portion on digital elements 1 when being lifted up by a common control plate 54. A shiftable member 50 is mounted at one end of each digital element 1 and has a projection on its right hand end adapted to cooperate with pin 12 on the respective wheel 11. When members 50 are moved to the right end position they limit the movement of wheels 11 to ten steps instead of eleven steps after which pin 12 would engage the other side of projection 9. When pawls 53 are lifted up by control plate 54 the movement of digital elements 1 is limited to so many steps in one direction as digital elements 14 can make in the other direction, since digital elements 1 and 14 are then coupled through racks 14a, wheels 51, racks 52 and pawls 53. For each step element 14 moves to the left, element 1 is allowed to move a corresponding step to the right, the maximal possible movement of elements 14 and 1, however, being reduced by one step, when element 50 is in its right hand blocking position.

This latter device is provided for printing negative results out of the electronic counter.

In order to explain the operation of the apparatus it may first be mentioned that as electronic counters can generally only count in one direction, subtractions are carried out in known manner by nine-complement addition.

The operation of the apparatus during reading out of a positive total registered in the electronic counter will now be described.

Figure 5:
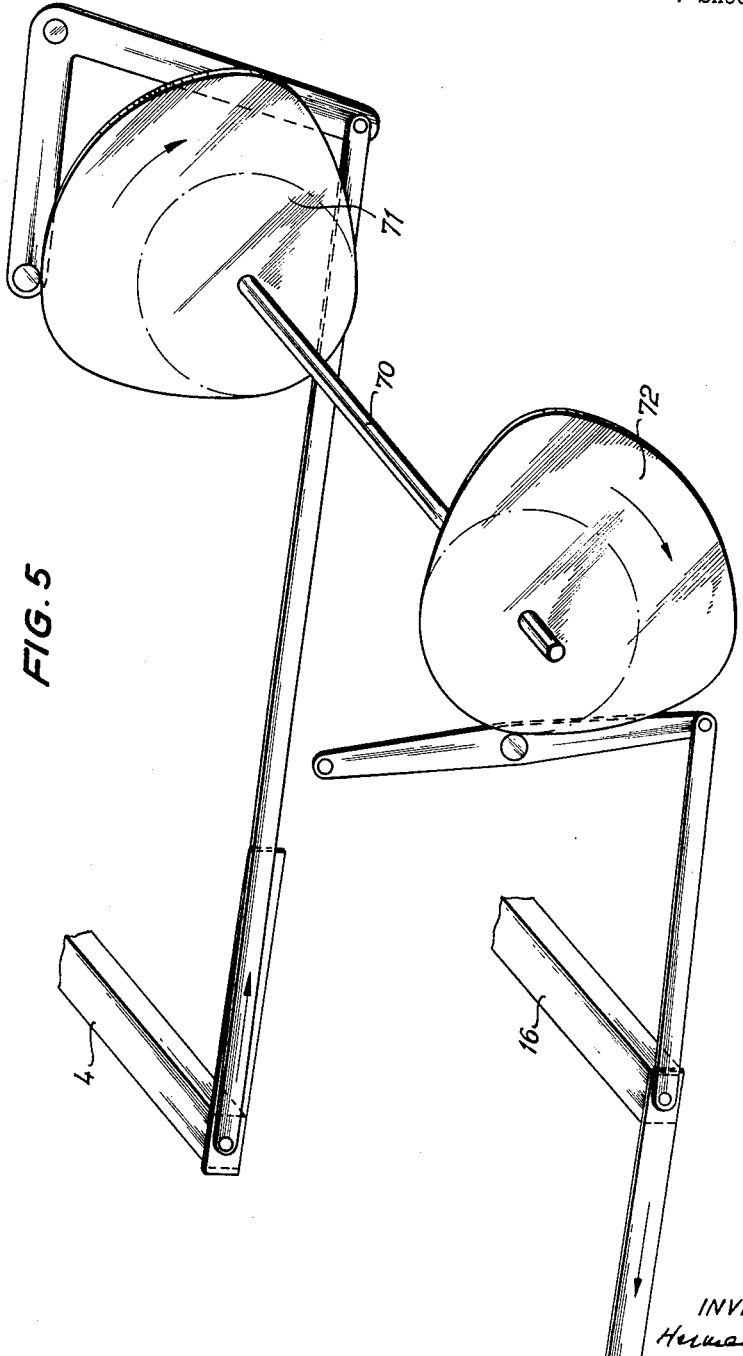
FIGURE 5 is a perspective view of the operating means.

The main drive shaft 70 (see FIG. 5) of the calculating machine drives operating means, for example cam means 71 and 72 by which the two control bars 4 and 16 are moved in opposite directions as indicated by arrows. Preferably, the movements of the control bars 4 and 6 can be almost simultaneous, for example control bar 16 is moved one step ahead of control bar 4. Consequently, control bar 16 will start a movement to the left, and when disk 23 produces the next impulses in the photocell, control bar 4 will start its synchronized movement to the right as viewed in FIGURE 1. Digital elements 14 and control element 20 follow the movement of control bar 16 to the left and disk 23 will produce ten impulses effective in each denominational order of the counter, so that the counter registers the same number as before after the ten impulses have been received. However, each order of the electronic counter produces a control impulse when passing through zero position, and this control impulse is used for actuating electro-magnetic stop means 19 associated with the respective denominational order, after having been amplified by means of a blocking oscillator.

Consequently, each digital element 14 is stopped by the associated electro-magnetic stop means 19 when the associated order of the counter is in zero position. Since the operation of the electronic counter is additive, the number of units added in each order of the counter when the same passes through zero, represents the complement of the digit registered in the respective order of the counter. Consequently, digital element 14 will move to a digital position representing the complement value. When ten impulses are added in each order of the counter, the counter assumes again its initial position, and the respective number remains registered in the counter. When the transmission of impulses from the photocell is interrupted in zero position of the counter, the counter is cleared.

During movement of the digital elements 14 to the left, the associated gears 11 are turned. As explained above, after the first step of digital elements 14, digital elements 1 start moving in opposite direction, so that the gear 11 turns under the influence of both associated elements 1 and 14. Since stop 12 on gear 11 abuts against the other side of projection 9 after eleven angular steps of gear 11, turning movement of gear 11 is prevented after eleven steps thereof, and when the respective digit element 14 moves further, the blocked gear 11 couples the associated digital element 1 to element 14, so that element 1 moves together with the element 14 under the action of the stronger spring 15 in the direction of movement of element 14. Due to this arrangement, digital elements 1 are moved to positions representing the real numerical value of the respective digits, whereas the elements 14 will move to positions representing the complement values of the digits.

A movement of wheels 11 by eleven steps instead of ten is necessary because in most adding machines the rest position of the digital elements 1 representing the differential actuators corresponds to the values 9, so that digital elements 1 have to be moved for instance by 3 steps in order to be moved to a position representing the value 2.

This will be best understood with reference to a numerical example. Assuming that the digit 2 is stored in one order of the electronic counter, the counter will pass through zero position after receiving eight impulses which correspond to eight steps of the digital element 14. Elements 14 and 1 move at the same rate since bars 4 and 16 are moved at the same speed by common drive means. After the sixth step of element 14 and after the fifth step of element 1, stop 12 engages projection 9 since gear 11 can turn only eleven angular steps. Consequently, element 1 is now rigidly connected to element 14, and as element 14 continues its movement under the action of spring 15, the direction of movement of element 1 is reversed, and element 1 moves to the left in opposite direction through two steps. Thus element 1 has moved to the right five steps and to the left two steps, and has performed a total movement to the right of three steps which corresponds to the digit registered in the respective order of the electronic counter. Printing means actuated by the rack portion 2 of digital elements 1 can correspondingly print the digit.

The operation of the apparatus for additively introducing numerical values into the electronic counter will now be described.

The pin-carriage 8 is set in a conventional manner by operation of a ten-key keyboard so that in each order of the pin carriage 8 selected pins 7 are in actuated position representing a digit in the respective order. Operation of the plus or minus key (see FIG. 3b and 4) of the keyboard also effects actuation of electro-magnetic means 29, so that cam 28 turns and effects locking of digit elements 14 and control element 20 which are not used during introduction of a number. Therefore, elements 14 and 20 cannot follow the automatic movement of control bar 16, and the slotted disk 23 is not turned.

Since the number registered in the pin carriage 8 is to be added in the electronic counter, the operator has actuated the addition key so that contacts bc and de are closed and an operating cycle of the machine is started. The operating means 71 of control bar 4 effects an operational cycle of control bar 4 consisting of a stroke to the right and a return stroke to the left. Elements 1 and 40 tend to follow the movement of control bar 4 to the right under the action of springs 3 and 41. However, digital elements 1 are stopped in differential digital positions in accordance with pins 7 actuated in the respective order since projections 6 will engage set pins 7. Control element 40 moves to the right during the entire first stroke of control bar 4 and turns slotted disk 45 so that nine impulses are produced by the photocell A which is connected over an amplifier to the transverse contact bar 32. The contact bars 31 are connected to the orders of the electronic counter so that impulses are transmitted through contacts 32, 33, 30 and 31 to the counter as long as contact bar 32 is in engagement with the denominational set of contacts 33. This position is individually maintained for each digital element 1 during movement to the right of control bar 4 until digital elements 1 are stopped in different positions by set pins 7 of pin carriage 8. As soon as a digital element 1 is stopped in a digital position, control bar 4 continuing its movement will separate contact bar 32 from the respective contact 33 of the stopped digital element 1, and no impulses will be transmitted to the counter after the respective digital element 1 has been stopped.

Consequently each order of the counter receives a number of impulses which is the same as the digit registered in the respective order of the pin carriage.

In the event that a number is already registered in the electronic counter, the newly introduced number is added to the previously registered number. The electronic counter is of conventional construction and therefore shown only schematically and is provided with tens-transfer means which become effective as the counter passes in each order through zero position.

If a number is to be subtracted from the number registered in the counter, the keyboard is actuated to introduce the number into the pin carriage. Thereupon, the subtraction key is operated and effects closing of contacts bc and df and an operational cycle of the machine. Closing of df means that the electronic counter is disconnected from the denominational series of contact bars 31 (contracts de) and is connected to the denominational series of sets of digital contacts 34 (contacts df).

During the following cyclic operation of control bar 4 in a stroke to the right and a return stroke to the left, digital elements 1 follow the movement of control bar 4 to the right until they are stopped by set pins 7 of the pin carriage. As described above, control bar 4 continues its movement while individual digital elements 1 are stopped successively in accordance with the number set in the pin carriage.

When any one digital element 1 is stopped, the contact 36 mounted thereon is also stopped opposite a pair of digital contacts 34/35 associated with the digit stored in the respective order of the pin carriage. As control bar 4 moves on to the right, actuating member 39 turns the respective contact 36 in counterclockwise direction and into a position engaging the respective contacts 34/35 thereby establishing a circuit between the impulse producing photocell A which is connected to all contacts 34 and the orders of the counter which are respectively connected to the contacts 35.

Consequently, the impulses produced by the photocell during movement of digital elements 1 with control bar 4 are not transmitted to the counter means, but when the respective elements 1 are stopped, the circuit is established and the following impulses will be transmitted to the orders of the counter, so that each order of the counter receives a number of impulses corresponding to the complement value of the digits stored in the respective orders of the pin carriage. Since nine impulses are produced by disk 45, the complement value transmitted to the counter is the difference between nine and the digit stored in the respective order of the pin carriage.

During the addition of nine-complements a fugitive one is produced above the highest order of the electronic counter, which is transferred to the lowest order of the counter to obtain a correct result. An electric or electronic switching element, for instance a flip-flop is provided for this purpose between the highest and lowest order of the electronic counter. This switching element is movable between a stable condition and an unstable condition and when a fugitive one occurs, the switching element passes from stable condition to unstable condition, and produces an impulse which is transmitted to the unit order of the counter so that a unit is added in this order.

The same impulse is supplied to a switching means 55 by means of an electromagnet 61, as shown in FIG. 2.

Switch 55 serves the purpose of determining whether the printing means prints a plus or a minus sign depending on the positive or negative value of the number to be printed. For example, when arm 56 of switching element 55 engages contacts 57, a minus sign will be printed, or the ribbon shifted from printing in black to printing in red. However, when contact arm 56 engages contact 58, a plus sign will be printed.

The contact arm 56 is mounted on a shaft which also carries two toothed wheels 60 and 62 so that members 56, 60 and 62 turn together. Ratchet wheel 60 is actuated by the above mentioned electro-magnetic means 61 through a pawl whenever a fugtive one occurs in the electronic counter. Ratchet wheel 62 is operated by an electro-magnetic means 63 through a pawl, whenever the minus key is operated.

The operation of this device will be best understood with reference to the following table which represents in three columns the calculating operation to be performed, the corresponding positions of switch means 55 and whether or not a fugitive one has been produced.

| | Operation | Position of arm 56 on | Fugitive one |
|---|---|---|---|
| 1 | Pos. total | contact 58 | no. |
| | Addition | | |
| | Pos. total | contact 58 | |
| 2 | Pos. total | contact 58 | yes. |
| | Subtraction | contact 57/1 | |
| | Pos. total | contact 58 | |
| 3 | Pos. total | contact 58 | no. |
| | Subtraction | contact 57/1 | |
| | Neg. total | contact 57/1 | |
| 4 | Neg. total | contact 57/1 | no. |
| | Addition | contact— | |
| | Neg. total | contact 57/1 | |
| 5 | Neg. total | contact 57/1 | yes. |
| | Subtraction | contact 57/2 | |
| | Neg. total | contact 57/1 | |
| 6 | Neg. total | contact 57/1 | yes. |
| | Addition | contact— | |
| | Pos. total | contact 58 | |

So far the operation of the apparatus has been described only with respect to additions and subtractions and to the taking of positive totals, but it is a particular advantage of the present invention that the apparatus can also be used for taking negative totals. The mechanism provided for this purpose has already been described with reference to FIG. 1.

A negative total is contained in the electronic counter in the form of the nine-complement of the actual numerical value. The digital elements 1 and 14, however, work on the basis of ten complements with respect to each other. The nine complements contained in the electronic counter in each denominational order are one unit lower than the corresponding ten-complements. In the usual operation for the taking of positive totals, the digital elements 14 would be moved to the ten-complements of the nine-complements contained in the electronic counter, which is in each denominational order one unit higher than the numerical value to be printed. This means that digital elements 14 must be moved to the ten-complements of the nine complements contained in the electronic counter reduced by one unit in each denominational order and that digital elements 1 must be moved the same number of steps as digital elements 14 move in the other direction. For this purpose digital elements 14 and 1 are coupled by means of parts 14a, 51, 52, 53, 54 and the movement of digital elements 14 is reduced by one step by the provision of shiftable members 50. Whenever there is a negative total contained in the electronic counter, switching arm 56 is in contact with contact plate 57. The total key, or the sub-total key, also operates contacts i, k when depressed. If now contact arm 56 is on contact 57 and contacts i, k are also closed, electromagnets 64, 66 will be energized. Electro-magnet 64 will move shiftable member 50 to the blocking position in which the movement of wheel 11 is reduced by one step, and electromagnet 66 will lift up plate 54, which serves to couple digital elements 14 and 1 over wheels 51, toothed bar 52 and pawls 53.

The method of operation of the device according to the invention will become particularly clear when considered in connection with the following examples:

Switch 55

[Electronic switching element (0-stable condition 1-unstable condition)]

| Electronic counter | | | | | Line | Computed numbers | | | |
|---|---|---|---|---|---|---|---|---|---|
| + | 0 | 00 000 | 000 | 000 | 1 | + | 0 | 000 000 | 000 |
| + | 0 | 00 000 | 000 | 123 | 2 | + | 0 | 000 000 | 123 |
| + | 0 | 00 000 | 000 | 123 | 3 | + | 0 | 000 000 | 123 |
| − | 0 | 99 999 | 999 | 975 | 4 | − | 0 | 000 000 | 024 |
| − | 1 | 00 000 | 000 | 098 | 5 | + | 0 | 000 000 | 099 |
| + | | | | +1 | 6 | | | | |
| + | 0 | 00 000 | 000 | 099 | 7 | + | 0 | 000 000 | 099 |
| − | 0 | 99 999 | 999 | 862 | 8 | − | 0 | 000 000 | 137 |
| − | 0 | 99 999 | 999 | 961 | 9 | − | 0 | 000 000 | 038 |
| + | 0 | 00 000 | 000 | 045 | 10 | + | 0 | 000 000 | 045 |
| − | 1 | 00 000 | 000 | 006 | 11 | + | 0 | 000 000 | 007 |
| + | | | | +1 | 12 | | | | |
| + | 0 | 00 000 | 000 | 007 | 13 | + | 0 | 000 000 | 007 |
| − | 0 | 99 999 | 999 | 991 | 14 | − | 0 | 000 000 | 008 |
| − | 0 | 99 999 | 999 | 998 | 15 | − | 0 | 000 000 | 001 |
| − | 0 | 99 999 | 999 | 993 | 16 | − | 0 | 000 000 | 006 |
| − | 1 | 99 999 | 999 | 991 | 17 | − | 0 | 000 000 | 007 |
| + | | | | +1 | 18 | | | | |
| − | 0 | 99 999 | 999 | 992 | 19 | − | 0 | 000 000 | 007 |
| + | | 00 000 | 000 | 008 | | + | 0 | 000 000 | 008 |
| − | 1 | 00 000 | 000 | 000 | | + | 0 | 000 000 | 001 |
| + | | | | +1 | | | | | |
| + | 0 | 00 000 | 000 | 001 | | + | 0 | 000 000 | 001 |
| + | 0 | 00 000 | 000 | 014 | | + | 0 | 000 000 | 014 |
| + | 0 | 00 000 | 000 | 015 | | + | 0 | 000 000 | 015 |
| − | 0 | 99 999 | 999 | 979 | | − | 0 | 000 000 | 020 |
| − | 0 | 99 999 | 999 | 994 | | − | 0 | 000 000 | 005 |
| + | 0 | 00 000 | 003 | 745 | | + | 0 | 000 003 | 745 |
| − | 1 | 00 000 | 003 | 739 | | + | 0 | 000 003 | 740 |
| + | | | | +1 | | | | | |
| + | 0 | 00 000 | 003 | 740 | | + | 0 | 000 003 | 740 |
| − | 0 | 99 999 | 996 | 259 | | − | 0 | 000 003 | 740 |
| − | 0 | 99 999 | 999 | 999 | | − | 0 | 000 000 | 000 |
| + | 0 | 00 000 | 000 | 000 | | + | 0 | 000 000 | 000* |

* Clearing before following calculating operation.

Before the start of the computing operations, all orders of the counter are cleared to zero positions indicated by line 1 of the table, and switch means 55 is in "plus" position. The keyboard is operated to set the pin carriage to the number 123. This number is introduced into the electronic counter as follows:

Control bar 4 moves to the right in FIGURE 1, and digital elements 1 engage associated pins to assume positions representing the introduced number. In the digital positions associated with zero, no impulse is created by the slotted disk 45, and the first impulse is produced in the digital position associated with the digit 1. After three impulses in the unit order, contacts 32 and 33 are separated and in the unit order of the electronic counter the digit 3 is registered. The other orders of the electronic counter are provided with electric impulses in a corresponding manner so that the counter is in the condition shown in lines 2 and 3, wherein line 2 represents the added number and line 3 represents the result of the addition to zero.

The number 24 is now to be subtracted. 24 is introduced by operation of the keyboard, and the subtraction key is actuated. Thereby, switch means 55 is shifted to "minus" position, contact bars 31 are disconnected, and contact bars 34 are connected to the electronic counter. As described above, the complement value of the negative number 24 is added in the electronic counter as shown in line 4 of the table. A fugitive one is produced whereby the electronic switching element is shifted to its unstable condition indicated by 1 in the second column of the table. At the same time, the switching element produces an impulse which actuates electro-magnetic means 61 and turns switch means 55 to its "plus" position. Another impulse is supplied to the lowest order of the counter, as shown in lines 5 and 6 of the table. At the end of the subtraction, the apparatus is in the condition illustrated by line 7 of the table.

It is desired to print this sub-total, and consequently the digital elements 14 of the lowest two orders are stopped after one step so that stop 12 on gear 11 permits movement of digital element 1 through ten steps whereby the respective associated type drums print nines. As regards the zeros before number 99, elements 14 are stopped after ten steps, and elements 1 perform each a single step, so that the zeros of the respective type drums are placed in printing position.

The number 137 is now subtracted from the number 99 stored in the counter, as shown in lines 8 and 9 of the table. It is desired to print the negative result registered in the counter. Switch means 55 has been placed in its "minus" position by operation of the subtraction key, member 50 has been operated, and plate 54 has been raised. Digital elements 14 run to a position representing the number 11 111 111 149. Latches 53 stop elements 1, in digital positions representing the number 38.

A complement value is registered in the electronic counter, to which number 45 is to be added as shown in line 10 of the table. The counter assumes the position indicated in line 11 of the table, and the switching element is moved to its unstable condition and supplies to electro-magnetic means 61 an impulse which is ineffective since switch 55 is already in "plus" position. The same impulse is supplied to the unit order of the electronic counter as shown in line 12 of the table so that the counter is in the condition shown in line 13 of the table and registers number 7.

Number 8 is now subtracted from the registered number 7, whereupon from the result minus 1, number 6 is subtracted as shown in line 16 of the table.

The electronic counter assumes the condition shown in line 17, and since switch means 55 is twice shifted, arm 56 moves to the second "minus" position. During the following shifting of switch 55 due to the occurrence of a fugitive one, switch 55 is again shifted from the second "minus" position to the first "minus" position so that switch 55 remains in "minus" position as shown in lines 18 and 19 of the table irrespective of the positive switching impulse passing through electro-magnetic means 61. The further computing operations shown in the table will be easily understood since they correspond to the above described operations.

The electronic counter used in the arrangement of the present invention may be of any conventional construction and may have electronic tubes, magnetic cores, or other electronic components for counting the electric impulses. The switching element before the highest order of the counter which controls the adjustment of the results by adding the fugitive one to the lowest order can be a flip-flop tube, or an electro-mechanical switch. The switch 55 has been described as an electro-mechanical switch, but can also be constructed as an electronic switching element. Any conventional component which performs the above described functions can be used in the apparatus of the present invention.

It will be understood that each of the elements described above, or two or more together, may also find a useful application in other types of calculating machines differing from the types described above.

While the invention has been illustrated and described as embodied in an adding apparatus combining mechanical elements with an electronic counter, it is not intended to be limited to the details shown, since various modifications and structural changes may be made without departing in any way from the spirit of the present invention.

What is claimed as new and desired to be secured by Letters Patent is:

1. In a calculating machine, in combination, a multi-denominational mechanism including a series of mechanical digital means movable between digital positions; electronic mounter means; impulse producing means; movable switch means connecting said impulse producing means with said counter means and being moved and controlled by said digital means so that said counter means receive a number of impulses depending on said digital positions; other impulse producing means connected to said counter means for actuating the same; driven mechanical means for effecting movement of said digital means and for controlling said other impulse producing means to produce an impulse for every digital position through which said digital means pass; means controlled by said counter means for arresting said digital means when the same are in positions representing real numerical values; and mechanical means controlled by said digital means for transferring numerical values represented by the same to a printing device.

2. In a calculating machine, in combination, a multi-denominational mechanism including a series of mechanical digital means movable between digital positions; electronic counter means; impulse producing means; movable switch means connecting said impulse producing means with said counter means and being moved and controlled by said digital means so that said counter means receive a number of impulses depending on said digital positions, said switch means including shiftable means shiftable between a first position associated with addition and a second position associated with subtraction, and effecting in said first position actuation of said counter means by a number of impulses representing a real numerical value, and in said second position actuation of said counter means by a number of impulses representing complement value so that the counter means perform only additive operations, other impulse producing means connected to said counter means for actuating the same; driven mechanical means for effecting movement of said digital means to produce an impulse for every digital position through which said digital means pass; means controlled by said counter means for arresting said digital means when the same are in positions representing real numerical values; and mechanical means controlled by said digital means for transferring numerical values represented by the same to a printing device.

3. In a calculating machine, in combination, a multi-denominational mechanism including an input means; a series of mechanical movable digital means controlled by said input means to assume corresponding digital positions, said mechanical movable digital means being adapted to operate output means to represent numbers; mechanical movable read-in impulse producing means operating in synchronism with said digital means and producing impulses corresponding to numerical values represented by said digital means; read-out impulse producing means including mechanical members operating in synchronism with said digital means and means controlled by said mechanical members for producing impulses representing complement numerical values; electronic counter means selectively actuated either by said read-in impulse producing means or by said read-out impulse producing means and stop means controlled by said counter means to arrest said digital means in digital positions representing a read-out number.

4. In a calculating machine, in combination, a multi-denominational mechanism including a pin carriage; a series of mechanical movable digital means controlled by said pin carriage and sensing the same to assume corresponding digital positions, said mechanical movable digital means being adapted to operate output means to represent numbers; mechanical movable read-in impulse producing means operating in synchronism with said digital means and producing impulses corresponding to numerical values represented by said digital means; read-out impulse producing means including movable mechanical members operating in synchronism with said digital means and means controlled by said mechanical members for producing impulses representing complement numerical values; electronic counter means selectively actuated either by said read-in impulse producing means or by said read-out impulse producing means; and stop means controlled by said counter means to arrest said digital means in digital positions representing a read-out number.

5. In a calculating machine, in combination, a multi-denominational mechanism including a pin carriage; a series of spring-loaded mechanical movable digital means controlled by said pin carriage to stop in corresponding digital positions, said mechanical movable digital means being adapted to operate output means to represent numbers; mechanical movable read-in impulse producing means having movable contacts operating in synchronism with said digital means and producing impulses corresponding to numerical values represented by said digital means; read-out impulse producing means including movable mechanical members operating in synchronism with said digital means and means controlled by said mechanical numbers for producing impulses representing complement numerical values; means for moving said digital means; driven mechanical means controlling the speed of movement of said digital means and of said contacts, and the number of impulses produced by said impulse producing means; electronic counter means selectively actuated either by said read-in impulse producing means or by said read-out impulse producing means; and mechanical stop means controlled by said counter means to stop said digital means in digital positions representing a read-out number.

6. In a calculating machine, in combination, a multi-denominational mechanism including a series of digital elements movable between digital positions; input means controlling said digital elements so that the same represent a numerical value; output means controlled by said digital elements; electronic counter means; a shiftable read-in element; means for moving said read-in element and said digital elements in synchronism; first impulse producing means controlled by said read-in element to produce impulses for digital positions of said digital elements and connected to said counter means for actuating the same; a shiftable read-out element; a read-out control means connected to each digital element for effecting movement of the same; means for moving said read-out element in synchronism with said read-out control means; second impulse producing means controlled by said read-out element to produce impulses for digital positions of said digital elements assumed under control of said read-out control means, and being connected to said counter means for actuating the same; means controlled by said counter means to produce a control impulse when said counter means arrives in zero position; and means controlled by said control impulse to stop movement of said read-out control means and thereby movement of said digital elements in a position representing a numerical value.

7. In a calculating machine as set forth in claim 6 including switch means connecting said first impulse producing means with said counter means and being controlled by said digital elements so that said counter means receive a number of impulses depending on said digital positions, said switch means including first means associated with addition and rendered operative by operation of the addition key and second means associated with subtraction and rendered operative by the operation of the subtraction key for effecting, respectively actuation of said counter means by a number of impulses representing a real numerical value, and actuation of said counter means by a number of impulses representing a complement value so that the counter means perform only additive operations.

8. In a calculating machine as set forth in claim 6 and including two stop means for stopping said digital means in positions representing numerical values corresponding to numerical values registered in said counter means; and means for selectively operating only one of said stop means.

9. In a calculating machine as set forth in claim 6 comprising switch means for connecting said first impulse producing means with said counter means, said switch means including a first set of digital switches associated with each digital element and actuated by the same in accordance with the digital positions thereof; a second set of digital switches associated with each digital element and actuated by the same in accordance with complement values of the digital positions of the same; means for selectively rendering operative only one of said sets for performing additions of numerical values, or for performing additions of complement values for subtractive operations, respectively.

10. An apparatus as set forth in claim 9 wherein said first set of digital switches includes a slide contact secured to the associated digital element, an elongated contact slidably engaged by said slide contact, another contact connected to the slide contact and fixed on said digital element for movement therewith, and a movable contact moving with said other contact and respective digital element until said digital means is stopped by said pin carriage whereupon said movable contact separates from said other contact.

11. An apparatus as set forth in claim 9 wherein said second set of digital switches includes a set of stationary digital contacts, and a movable contact engaging one of said stationary contacts when said digital element is stopped by said pin carriage in a position representing a number so that engaged stationary contacts transmit a number of impulses representing the complement value of the number.

12. In a calculating machine, in combination, a series of digital means, each digital means including a digital element, a movable control element, and means connecting said movable control element with said digital element in such a manner that said digital element and said control element move in opposite directions until they are spaced a selected distance corresponding to a selected number, and are then connected for movement together in one direction; impulse producing means for producing an impulse in each digital position of said movable elements; electronic counter means connected to said impulse producing means for receiving said impulses so that said counter means passes through a zero position after receiving said impulses; and stop means controlled by said counter means to stop said digital means when said counter passes through the zero position so that the respective digital position of a digital element represents a digit previously registered in said counter means.

13. In a calculating machine, in combination, a series of digital means, each digital means including a digital element, a movable control element, and means connecting said movable control element with said digital element in such a manner that said digital element and said control element move in opposite directions until they are spaced a selected distance corresponding to a selected number, and are then connected for movement together in one direction so that digital element represents a real numerical value when said movable element is stopped in a position representing a complement value; impulse producing means for producing an impulse in each digital position of said movable elements; electronic counter means connected to said impulse producing means for receiving said impulses so that said counter means passes through a zero position after receiving a number of impulses which is the complement of a number previously registered in said counter means with respect to said selected number; and stop means controlled by said counter means to stop said digital means when said counter passes through the zero position so that the respective digital position of a digital element represents a digit previously registered in said counter means.

14. In a calculating machine as set forth in claim 13; a non-counting switching element associated with said counter means and shiftable between two positions, said switching element being associated with the highest effective order of said counter means for effecting adjustment of counted numerical values during complement additions.

15. An apparatus as set forth in claim 14 wherein said switching element is an unstable flip-flop means.

16. An apparatus as set forth in claim 14 and including a switching means adapted to be controlled by the addition key and by the subtraction key of the calculating machine, and being controlled by said switching element to effect switching operations for transforming negative real numerical values into complement values, and for transforming complement values into negative real numerical values.

17. An apparatus as set forth in claim 14 and including an electro-mechanical switch adapted to be controlled by the addition key and by the subtraction key of the calculating machine, and being controlled by said switching element to effect switching operations for transforming negative real numerical values into complement values, and for transforming complement values into negative real numerical values.

18. In a calculating machine, in combination, a pin carriage; a series of digital means, each digital means including a digital element adapted to be controlled by said pin carriage and adapted to control output means, a movable control element, and means connecting said movable control element with said digital element in such a manner that said digital element and said control element move in opposite directions until they are spaced a selected distance corresponding to a selected number, and are then connected for movement together in one direction so that digital element represents a real numerical value when said movable element is stopped in a position representing a complement value; a shiftable read-in element; means for moving said read-in element and said digital elements in synchronism; first impulse producing means controlled by said read-in element to produce impulses for the digital positions of said digital elements; second impulse producing means for producing an impulse in each digital position of said movable elements; electronic counter means connected to said first and second impulse producing means for receiving said impulses so that said counter means passes through a zero position after receiving from said second impulse producing means a number of impulses which is the complement of a number previously registered in said counter means with respect to said selected number; and stop means controlled by said counter means to stop said digital means when said counter passes through the zero position so that the respective digital position of a digital element represents a digit previously registered in said counter means.

19. In a calculating machine, in combination, a pin carriage; a series of digital means, each digital means including a digital element adapted to be controlled by said pin carriage and adapted to control output means, a movable control element, and means connecting said movable control element with said digital element in such a manner that said digital element and said control element move in opposite directions until they are spaced a selected distance corresponding to a selected number, and are then connected for movement together in one direction so that digital element represents a real numerical value when said movable element is stopped in a position representing a complement value; a shiftable read-in element; means for moving said read-in element and said digital elements in synchronism and including spring means connected to said elements, and cam controlled means retaining said elements; first impulse producing means controlled by said read-in element to produce impulses for the digital positions of said digital elements; second impulse producing means for producing an impulse in each digital position of said movable elements; electronic counter means connected to said first and second impulse producing means for receiving said impulses so that said counter means passes through a zero position after receiving from said second impulse producing means a number of impulses which is the complement of a number previously registered in said counter means with respect to said selected number; and stop means controlled by said counter means to stop said digital means when said counter passes through the zero position so that the respective digital position of a digital element represents a digit previously registered in said counter means.

20. In a calculating machine, in combination, a multi-denominational mechanism including a series of digital means movable between digital positions; read-out impulse producing means; an electronic counter means connected to said read-out impulse producing means for receiving actuating impulses so that said counter means passes through zero position; each digital means including a movable element, a digital element adapted to control printing means, a member turnably mounted on the digital element and operatively connected with said movable element to be turned by the same, means for stopping turning movement of said member after turning movement through a selected angle; means controlling said impulses producing means to produce an impulse for every digital position through which said movable elements pass; stop means electrically controlled by said counter means to stop said movable elements when said counter means pass through said zero position; and means for moving said movable element and said digital element in opposite directions so that when said movable element is stopped by said stop means in a position representing a complement value, said digital element stops in a position representing the real numerical value.

21. In a calculating machine, in combination, a multi-denominational mechanism including a series of digital means movable between digital positions; read-out impulse producing means; an electronic counter means connected to said read-out impulse producing means for receiving actuating impulses so that said counter means passes through zero position; each digital means including a movable element, a digital element adapted to control printing means, a member turnably mounted on the digital element and operatively connected with said movable element to be turned by the same, means for stopping turning movement of said member after turning movement through a selected angle; means controlling said impulses producing means to produce an impulse for every digital position through which said movable elements pass; stop means electrically controlled by said counter means to stop said movable elements when said counter means pass through said zero position; means for moving said movable element and said digital element in opposite directions so that when said movable element is stopped by said stop means in a position representing a complement value, said digital element stops in a position representing the real numerical value; read-in impulse producing means; and switch means connecting said read-in impulse producing means with said counter means and being controlled by said digital means so that said counter means receives and registers a number of impulses depending on said digital positions.

22. In a calculating machine, in combination, a multi-denominational mechanism including a series of digital means movable between digital positions; read-out impulse producing means; an electronic counter means connected to said read-out impulse producing means for receiving actuating impulses so that said counter means passes through zero position; each digital means including a movable element, a digital element adapted to control printing means, a wheel turnably mounted on the digital element and operatively connected with said movable element to be turned by the same, means for stopping turning movement of said wheel after turning movement through a selected angle; means controlling said impulses producing means to produce an impulse for every digital position through which said movable elements pass; stop means electrically controlled by said counter means to stop said movable elements when said counter means pass through said zero position; means for moving said movable element and said digital element in opposite directions so that when said movable element is stopped by said stop means in a position representing a complement value, said digital element stops in a position representing the real numerical value; read-in impulse producing means; switch means connecting said read-in impulse producing means with said counter means and being controlled by said digital means so that said counter means receives a number of impulses depending on said digital positions, said switch means including first means associated with addition and rendered operative by operation of an addition key and second means associated with subtraction and rendered operative by the operation of a subtraction key for effecting, respectively, actuation of said counter means by a number of impulses representing a real numerical value, and actuation of said counter means by a number of impulses representing a complement value so that said counter means performs only additive operations.

23. In a calculating machine, in combination, a multi-denominational mechanism including a series of digital means movable between digital positions; read-out impulse producing means; an electronic counter means connected to said read-out impulse producing means for receiving actuating impulses so that said counter means passes through zero position; each digital means including a movable element, a digital element adapted to control printing means, a wheel turnably mounted on the digital element and operatively connected with said movable element to be turned by the same, means for stopping turning movement of said wheel after turning movement through a selected angle; means controlling said impulses producing means to produce an impulse for every digital position through which said movable elements pass; stop means electrically controlled by said counter means to stop said movable elements when said counter means pass through said zero position; means for moving said movable element and said digital element in opposite directions so that when said movable element is stopped by said stop means in a position representing a complement value, said digital element stops in a position representing the real numerical value; read-in impulse producing means; switch means connecting said read-in impulse producing means with said counter means and being controlled by said digital means so that said counter means receives a number of impulses depending on said digital positions; a non-counting switching element associated with said counter means and shiftable between two positions, said switching element being associated with the highest effective order of said counter means for effecting adjustment of counter numerical values during complement additions; two stop means for stopping said digital means in positions representing numerical values corresponding to numerical values registered in said counter means; and means for selectively operating only one of said stop means.

24. In a calculating machine, in combination, a multi-denominational mechanism including a series of digital means movable between digital positions; impulse producing means; an electronic counter means connected to said impulse producing means for receiving actuating impulses so that said counter means passes through zero position; means controlling said impulses producing means to produce an impulse for every digital position through which said movable elements pass; stop means electrically controlled by said counter means to stop said digital means when said counter means pass through said zero position whereby the respective digital position of said digital means represents a digit registered in said counter means, said digital means each including a toothed element stopped by said stop means, a digital element adapted to control printing means, a toothed wheel turnably mounted on the digital element and meshing with said toothed element, means on said toothed wheel for stopping turning movement of the same after a predetermined number of steps; means for moving said toothed element and said digital element in opposite directions so that when said toothed element is stopped by said stop means in a position representing a complement value, said digital element stops in a position representing the real numerical value; read-in impulse producing means; and switch means connecting said read-in impulse producing means with said counter means and being controlled by said digital means so that said counter means receives and registers a number of impulses depending on said digital positions.

25. In a calculating machine, in combination, a multi-denominational mechanism including a series of digital means movable between digital positions; means for effecting movement of said digital means; impulse producing means producing an impulse in each digital position of said digital means; an electronic counter means connected to said impulse producing means for receiving actuating impulses so that said counter means passes through zero position; stop means electrically controlled by said counter means to stop said digital means when said counter means pass through said zero position whereby the respective digital position of said digital means represents a digit registered in said counter means, said digital means each including a toothed element stopped by said stop means, a digital element adapted to control printing means, a toothed wheel turnably mounted on the digital element and meshing with said toothed element, means on said toothed wheel for stopping turning movement of the same after a predetermined number of steps; and means for moving said toothed element and said digital element in opposite directions so that when said toothed element is stopped by said stop means in a position representing a complement value, said digital element stops in a position representing the real numerical value.

26. An apparatus as set forth in claim 25, wherein said digital positions are respectively associated with the digits from zero to nine, and wherein said toothed wheel is turnable through eleven steps.

References Cited in the file of this patent

UNITED STATES PATENTS

| | | |
|---|---|---|
| 1,834,561 | Watson | Dec. 1, 1931 |
| 2,285,353 | Peirce | June 2, 1942 |
| 2,595,045 | Desch et al. | Apr. 29, 1952 |
| 2,639,378 | Moerman | May 19, 1953 |
| 2,727,683 | Allen et al. | Dec. 20, 1955 |
| 2,757,862 | Boyden et al. | Aug. 7, 1956 |
| 2,783,939 | Boyden et al. | Mar. 5, 1957 |
| 2,986,333 | Thomas | May 30, 1961 |